United States Patent [19]
Lutz

[11] 3,968,324
[45] July 6, 1976

[54] CIRCUIT ARRANGEMENT FOR SYNCHRONIZING THE LETTERS/FIGURES LEVELS OF SEVERAL INPUT AND OUTPUT DEVICES IN TELEPRINTERS

[75] Inventor: Roman Lutz, Munich, Germany

[73] Assignee: Siemens Aktiengesellschaft, Berlin & Munich, Germany

[22] Filed: Mar. 6, 1975

[21] Appl. No.: 555,880

[30] Foreign Application Priority Data
Mar. 18, 1974 Germany............................ 2413013

[52] U.S. Cl. .............................. 178/2 R; 178/26 R; 178/79
[51] Int. Cl.² ......................................... H04L 17/02
[58] Field of Search ........... 178/23 R, 26 R, 69.5 R, 178/17 R, 17.5, 17 C, 79, 2 R, 3; 179/15 AF

[56] References Cited
UNITED STATES PATENTS

| | | |
|---|---|---|
| 3,459,890 | 8/1969 | Augustin et al.................... 178/26 R |
| 3,555,186 | 1/1971 | Soleure ............................. 178/17 C |
| 3,617,628 | 11/1971 | Holstein et al..................... 178/17 R |

*Primary Examiner*—Thomas A. Robinson
*Attorney, Agent, or Firm*—Hill, Gross, Simpson, Van Santen, Steadman, Chiara & Simpson

[57] ABSTRACT

An arrangement for synchronizing one or more input-/output devices in teleprinters in the context of a subdivision, necessitated by the use of a five-bit code (CCITT 2) for communications transmission purposes, of the total quantity of characters into letters/-figures levels employs a storage device in which the level relationship (letters and figure levels) of the character last transmitted or received is stored. A comparator connected to the storage device compares the level relationship of the stored character with that of a character ready for transmission and in the event of disparity operates, via a logic arrangement, to effect the introduction of a level-related switching symbol.

3 Claims, 2 Drawing Figures

CIRCUIT ARRANGEMENT FOR SYNCHRONIZING THE LETTERS/FIGURES LEVELS OF SEVERAL INPUT AND OUTPUT DEVICES IN TELEPRINTERS

BACKGROUND OF THE INVENTION

1. Field of the Invention

The present invention relates to an arrangement for synchronizing one or more input/output devices in teleprinters, and more particularly to such synchronization in the context of the subdivision, necessitated by the use of a five-bit code (CCITT 2) for communications transmission purposes, of the total quantity of characters into letters/figures levels.

2. Description of the Prior Art

When using a five-bit code, as for example the CCITT number 5 code, in teleprinter operations, for reasons which are due to the restricted number of combinations available (32 possibilities) from 5 bits and due to the large quantity of characters (letters, figures, commands) required to be transmitted, on the other hand, it is necessary to divide this quantity into subsidiary quantities, so-called levels, and to characterize each of these by the use of a special switching symbol. In this context, the totality of letters involved is assigned the switching symbol Bu and the totality of figures involved is assigned the switching symbol Zi. Depending upon the design of the teleprinters being used, with each change in level (shift) a switching symbol must be introduced either manually or by means of an automatic system. This switching symbol or signal ensures that the levels are synchronized between the transmitting and receiving stations, or between the corresponding input and output devices within one teleprinter where, for example, the keyboard (input device) is being used to operate through a perforator (output device) in order to record a punched tape.

In modern teleprinters, an automatic device ensures that switching symbols for synchronizing the letters/figures levels of several communicating teleprinters are inserted. Generally speaking, by means of an additional device, when operation commences, and with any change in the mode of operation, the communicating teleprinters are first of all placed in a neutral condition and then, prior to the transmission of a level-related character, a switching symbol is introduced. When using punched tapes, these switching symbols may be perceptible, and this constitutes a drawback. If, for example, a punched tape which is to be corrected is stopped in the reader unit at the character requiring correction, and if this character is then corrected by means of the keyboard, then in the new punched tape, before the character which is to be corrected, a switching symbol is punched unnecessarily because a change in mode of operation has taken place at that point. This introduction of unnecessary switching symbols constitutes a particular disadvantage in that the same is a nuisance when the teleprinter is being employed in association with electronic data processing systems which involve the production of punched tapes of proper format throughout.

SUMMARY OF THE INVENTION

The object of the present invention is to provide an arrangement for teleprinters employing automatic switching between letters and figures levels (so-called storage-type transmitters), with the help of which the letters/figures levels of the input/output devices of the teleprinters can be synchronized in such a fashion that unnecessary switching signals which are responsible for producing letters/figures shifts, are avoided.

According to the invention, the foregoing object is achieved in that a storage device is provided in which, from the sequence of transmitted and received characters, the level relationship (letters and figures levels) of the character last transmitted or received is stored; and in that a comparator device connected to the storage device compares a character ready for transmission with the stored character, in terms of the level relationship therebetween, and in the event of any disparity acts through a logic arrangement to effect the introduction of a level-related switching symbol.

Through the utilization of this type of arrangement, an advantage is obtained in that, in the context of a punched tape correction, no additional symbol is punched in the tape. Accordingly, it is possible to manufacture punched tapes which are of correct format throughout, where a given number of characters occur between two carriage return symbols.

In a further advantageous embodiment of the invention, the storage device is connected with a keyboard, so that through the keyboard the store content can be directly modified. Furthermore, the comparator and storage device is combined with a receiver and printing device so that, in this fashion, the comparator and storage device receives from the receiving and printing device the information concerning the state of operation (transmit/receive) and the level relationship of the characters arriving in the receiver.

It therefore becomes possible, by means of this type of arrangement, independently of the automatic system, to selectively transmit switching symbols. A further advantage resides in the fact that in the receiving operation the comparator and storage device is controlled directly by the printer device, and that, consequently, this control can be effected extremely quickly and without great expense.

BRIEF DESCRIPTION OF THE DRAWINGS

Other objects, features and advantages of the invention will be best understood from the following detailed description of preferred embodiments of the invention taken in conjunction with the accompanying drawings, on which.

DESCRIPTION OF THE PREFERRED EMBODIMENTS

Figure 1:
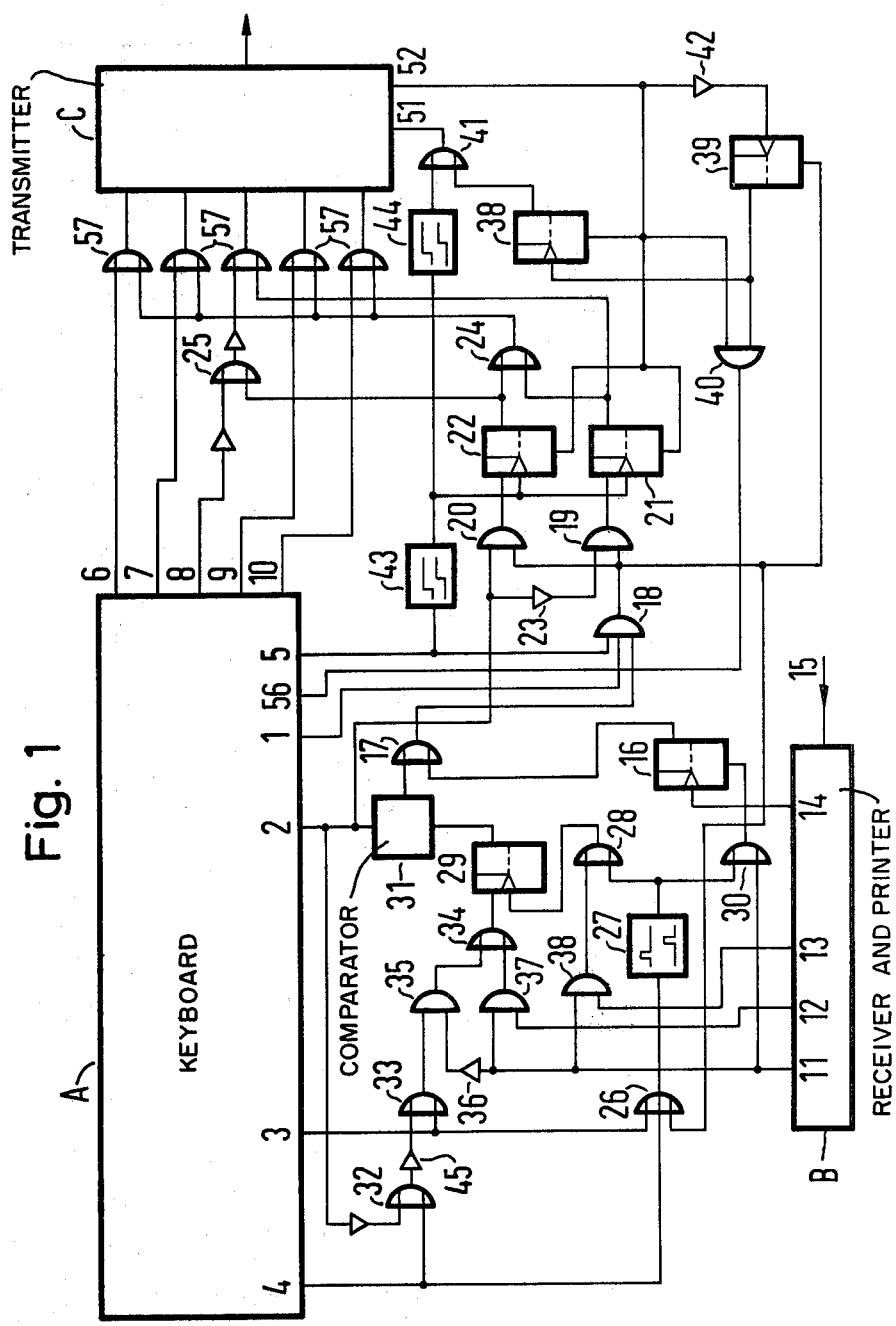
FIG. 1 is a block diagram illustration of a circuit arrangement constructed in accordance with the invention and utilized in a teleprinter.

Referring first to FIG. 1, a block diagram illustration of a circuit arrangement constructed in accordance with the invention, in a teleprinter, is shown. The overall teleprinter device is composed of several blocks which are combined with one another through the medium of the circuit arrangement in accordance with the invention and comprises a keyboard A, a receiver and printer B and a transmitter C.

The keyboard A is connected by a number of outputs with the arrangement constructed in accordance with the invention. Here, with keyboard operation, the following individual signals appear at these outputs:

At the output 1 a logic "1" appears if the signal to be transmitted is a level-related character, and alternatively, a logic "0" appears in the event of any command;

At the output 2 a logic "1" appears in the case of figures and a logic "0" appears in the case of letters, so that the distinction in terms of letters/figures levels is effective at this output;

At the output 3 a signal appears responsive to the operation of a figures shift key;

At the output 4 a signal appears in response to the operation of a letters shift key and it is therefore possible with the outputs 3 and 4 to select a level from the keyboard independently of the automatic system;

At the output 5 the keyboard supplies a character timing pulse with each character to the synchronizing circuit; and At the outputs 6–10 the actual information output of the keyboard is obtained with the bits one to five.

By way of the lines 11–14, the receiver and printer B is coupled with the device constructed in accordance with the invention. If the teleprinter is in the reception, coding or reading mode, then the analyzer circuit is activated by way of the line 11. The letters/figures shift symbols arriving by way of the receiver line 15 determine the level relationship of the receiver and printer and, therefore, through the line 12, that of the circuit arrangement. On initiation of printer and receiver operation through the agency of a switch which supplies an output signal at the output 14, the arrangement is supplied with the requisite control pulse train through the line 13.

When the teleprinter is started, commencing from the receiver and printer B, via the line 14, the trigger stage 16 is set. As a consequence, via an OR gate 17, a logic "1" is applied to one input of an ensuing AND gate 18. The two other inputs of the AND gate 18 are combined with the outputs 1 and 5 of the keyboard. The AND gate 18, in turn, is connected to additional AND gates 19 and 20 which control two trigger stages 21 and 22, respectively. Depending upon the nature of the switching symbol which is to be inserted, with figures shift the trigger stage 22, through an OR gate 24 and the OR gates 25, 57, and with letters shift the trigger stage 21, likewise via the OR gate 24 and the OR gates 57, switches through the connection to the information input of the transmitter. The AND gates 19 and 20 have their second inputs connected to the output 2 (figures level/shift) of the keyboard A, an inverter 23 being arranged between the output 2 and the AND gate 19. The AND gate 18 then establishes connection with the AND gate 19 or the AND gate 20, as the case may be, and accordingly produces a switching symbol pulse if, in addition to the readiness signal coming from the receiver and printer, there is also applied to the AND gate 18, via the output 1, the signal corresponding to a level-related character, and via the output 5, the timing pulse. The switching symbol pulse, in the manner described hereinbefore, now sets the trigger stages 21 and 22 through the AND gates 19 and 20. Simultaneously, the switching symbol pulse passes through an OR gate 26 and a delay element 27 and, by way of an additional OR gate 28, supplies a trigger stage 29 which functions as a store, the signal providing the information concerning the level relationship of the character last transmitted, in this case the switching symbol itself. At the same time, via an OR gate 30, the trigger stage 16 is reset. After completion of the switch-in phase, a transition to normal keyboard operation can then be made.

A comparator 31 compares the level relationship stored in the store 29 of the last character transmitted and received with the level relationship of the character which is ready for transmission at that particular instant, and in the event of disparity applies a signal (logic 1) to the OR gate 17. If the character ready for transmission is also a level-related character (line 1) and if a character timing pulse follows by way of the output 5, then in correspondence with the level-related character referred to previously, a switching symbol is introduced through the agency of the ensuing logic system. Simultaneously, in a manner known per se, the switching symbol pulse acts, via the OR gate 26, the delay element 27, and the additional OR gate 28, to store the new level relationship in the store 29.

By means of keyboard keys for letters level (shift) and figures level (shift) 3 and 4, respectively, it is possible to select the letters and figures levels independently of the automatic system. Because, when this key is depressed, it is a command which is produced and not a character, in this case a logic "0" appears at the output 1 and the AND gate 18 is accordingly blocked. Any disparity pulse which now appears is thus prevented from giving rise to the production of a switching symbol pulse. Because, however, the outputs 3 and 4 are connected via OR gates 33, 33, 34, an intervening inverter 45 and an AND gate 35, to the store 29, at the input of the level store the appropriate information appears on depression of the letters shift or figures shift keys 3, 4. Generally speaking, in keyboard operation the receiver and printer output 11 carries the "0" condition and in this case the level store 29 is set via the lines 2, 3, 4 and the gates 32, 33, 34 and 35. The actual transfer of information into the store is brought about by the signal arriving via the OR gate 26 and delayed by the timing element 27.

If the entire arrangement is in the receiving, characterizing or reading operation, no character pulse can reach the AND gate 18 due to the fact that the keyboard is switched off. The AND gate 18 cannot switch through and therefore an unnecessary insertion of switch-over characters is avoided. In the case of these operational conditions, during which the output 11 carries a logic "1", the adjusted level is applied to the store 29 by way of the output 12, the AND gate 37 and the OR gate 34. The transfer to the store 29 takes place by way of a special transfer pulse applied to the output 13 of the receiver and printer B, which pulse controls the store 29 by way of the AND gate 38 and the ensuing OR gate 28.

Figure 2:
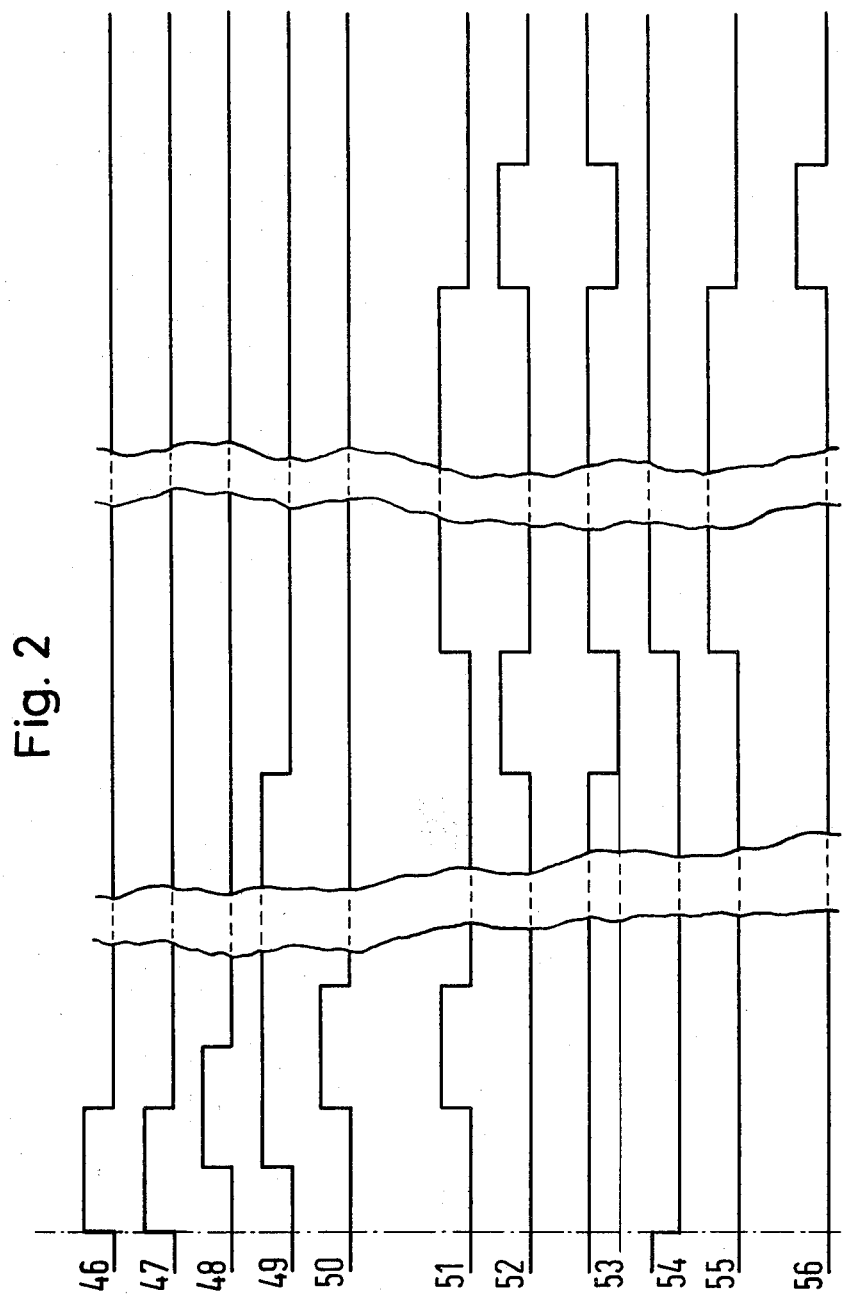
FIG. 2 is a pulse diagram illustrating command control in the arrangement constructed in accordance with FIG. 1.

The actual command control of the entire arrangement takes place by way of the two flip-flops 38 and 39 in connection with an AND gate 40 and an OR gate 41, an inverter 42 and timing elements 43 and 44. The work cycle of the command control will be explained in more detail below with reference to the pulse diagram illustrated in FIG. 2. The pulses illustrated in FIG. 2 are associated with the following points within the circuit arrangement:

Pulse 46—keyboard output 5,
Pulse 47—output gate 18,
Pulse 48—output timing element 43,
Pulse 49—output gate 24,
Pulse 50—output timing element 44,
Pulse 51—input transmitter 51, Pulse 52—output transmitter 52,
Pulse 53—output inverter 42,
Pulse 54—output flip-flop 39,
Pulse 55—output flip-flop 38, and
Pulse 56—keyboard input 56.

The character timing pulse 46, in the context of a level-related character, acts directly through the AND gate 18 to trigger the switching symbol pulse 47. The switching symbol pulse 47 resets the trigger stage 39. At the same time, the character timing pulse 46 is delayed by the timing element 43. The delayed pulse, through the trigger stages 21 and 22 and the ensuing OR gate 24, applies the corresponding switching symbol to the input OR gates 57 of the transmitter C. In addition, the pulse 46 is delayed again by a further timing element 44 and acts by way of the input 51 to the transmitter C to effect transfer of the coded switching symbol applied to the input, into the transmitter, followed by transmission.

Once the transmitter C has transmitted the symbol, the output 52 produces the acknowledged pulse 52 which, first of all, resets the trigger stages 21, 22 and 38 in inverted form, as the pulse 53 sets the trigger stage 39. The trigger stage 39 in turn, by means of the pulse 55, sets the trigger stage 38 which then, by way of the OR gate 41, supplies to the input 51 of the transmitter C the command to transmit the information character following the switching symbol and present at the input OR gates 57. After initiation of transmission, via the output 52, the acknowledged pulse 52 then follows and acts through the AND gate 40 and the input 56 of the keyboard A to collect the information from the information outputs 6—10.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An arrangement for synchronizing input/output devices in teleprinters as relates to a subdivision, necessitated by the use of a five-bit code for communications transmission purposes, of the total quantity of characters into letters/figures level assignments, the teleprinter including a receiver and a transmitter, said arrangement comprising:

a storage device connected to the transmitter and to the receiver for storing the level assignment of the last transmitted or received character from the sequence of transmitted and received characters;

a comparator connected to said storage device for comparing the level assignment of the stored character with that of a character ready for transmission; and a logic arrangement connected between said comparator and the transmitter for introducing a level-related switching symbol in response to disparity determined by said comparator.

2. The arrangement of claim 1, comprising a keyboard connected to said storage device for directly modifying the content of said storage device.

3. The arrangement of claim 1, comprising a printer combined with said storage device and said comparator for feeding information relating to the printer level relationship to said comparator and to said storage device.

* * * * *